UNITED STATES PATENT OFFICE.

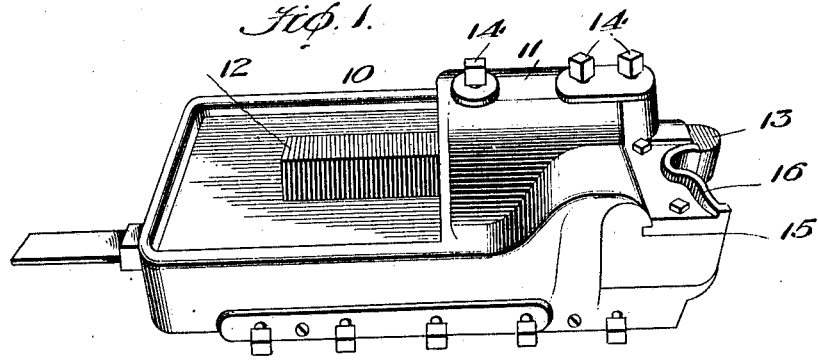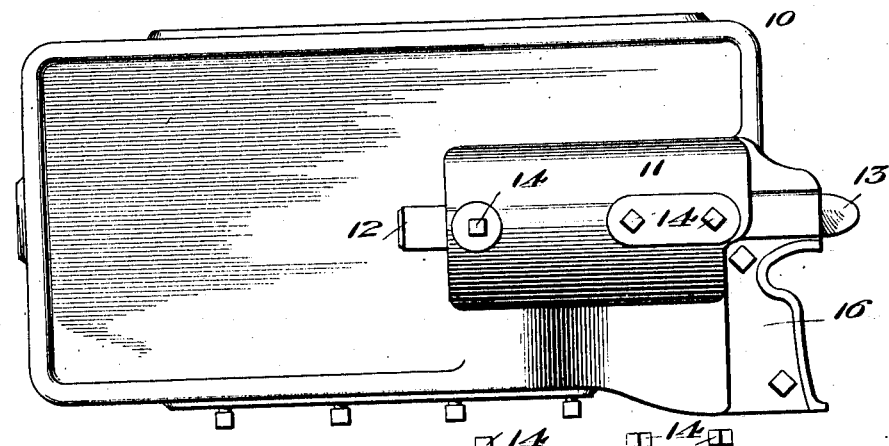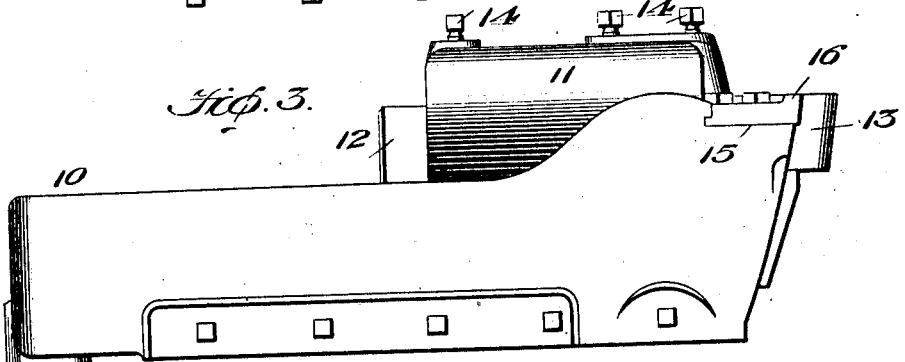

SALMON WILDER PUTNAM, 3D, OF FITCHBURG, MASSACHUSETTS, AND FRANK JOSEPH BAUMIS, OF RENSSELAER, NEW YORK.

TOOL-HOLDER.

1,048,734.  Specification of Letters Patent.  Patented Dec. 31, 1912.

Application filed May 25, 1912. Serial No. 699,666.

*To all whom it may concern:*

Be it known that we, SALMON W. PUTNAM, 3d, a citizen of the United States, residing at Fitchburg, in the county of Worcester and State of Massachusetts, and FRANK J. BAUMIS, a citizen of the United States, residing at Rensselaer, in the county of Rensselaer and State of New York, have invented certain new and useful improvements in Tool-Holders, of which the following is a specification.

Our invention relates to certain new and useful improvements in tool-holders, and particularly those adapted for use upon the well known driving-wheel lathe, coach and truck-wheel, lathe and steel tire turning lathe, and our invention consists of the improved tool-holder substantially as we will hereinafter describe and claim.

A tool holder of the character described is used principally for turning tires of wheels mounted upon axles, but it will be understood that the invention is applicable to any field of tire-turning where the common round-nose roughing tool is used to true up a tire before the forming tool is used to finish the tire.

In the accompanying drawings forming part of this specification and in which similar reference characters indicate like parts in the several views:—Figure 1 is a perspective view of a tool-holder embodying our invention. Fig. 2 is a top plan view of the same. Fig. 3 is a side view. Fig. 4 illustrates a portion of a wheel showing the contour of a worn tire. Fig. 5 is a view of a portion of a wheel showing the contour of a true tire.

To make our invention better understood, we have illustrated in Figs. 4 and 5, a part of a coach or truck wheel, Fig. 5, showing the true contour of an acceptable form commonly found upon many wheels of the character specified, and Fig. 4 showing a typical shape of the same wheel after it has been in service, the outside lines being intended to show the worn condition of the wheel. When wheels show such a worn condition as shown in said Fig. 4, they are removed from the trucks and put into a suitable lathe for turning. The first operation is what is termed a "roughing out", the line of the cut being indicated by a grooved line along the tread of the wheel and on top of the flange of said wheel; that portion of Fig. 4 shown cross hatched is cut away by the roughing tool and which tool is most commonly started at the point, X, and continues in the direction of the arrow toward the point, Y, but it will be understood that this operation may be reversed and the cutting may start at the point Y, and continue toward the point, X. The top of the flange of the wheel is also cut away either before or after the cut along the tread of the wheel, but the cutting away of the flange is usually done after the tread cut to more easily remove the top of the flange to the proper height above the tread. After this roughing operation forming tools are used to shape the tire of the wheel to give it substantially the contour shown in Fig. 5, and different shapes of tools have heretofore been used for this purpose. The earlier practice was to use one form of tool corresponding to the line, A, B of Fig. 5; another plan was to use a tool corresponding to the line B—C; a still further plan was to use a tool corresponding to the line, C—D, and a still further method was to use a tool corresponding to the line, D—E, of Fig. 5. Later practice and the one most commonly used at the present date is to have one forming tool corresponding to the line A—B—C—D of Fig. 5 and a second forming tool corresponding to the line D—E of said figure. We prefer, however, to use one complete forming tool or in other words a tool having a contour corresponding to the line A—B—C—D—E, but it will be readily apparent that a very rigid machine is required to carry such a cut.

While the foregoing reference to the prior art and to the cutting operations of wheels of the character specified, may indicate that only one wheel is to be cut, we will state that this description will apply equally to two wheels, one at each end of the machine, and these may or may not be mounted upon axles, this depending upon the particular type of lathe with which the tool holder is used.

When it is taken into consideration that the daily output of a modern tire turning lathe is a considerable number of wheels, it will be apparent that the operator of such a machine must make many tool changes, which not only is fatiguing to him but consumes and wastes much time, which time if other devices or means were supplied could be used upon the real work to be performed, or the actual machining of the tire portion of the lathe. To meet this latter condition, is a leading object of the present invention.

Various forms of tool-holders have been employed in tire turning lathes, as before mentioned, and some of the prior devices require the loosening and tightening of as many as four nuts, upon each tool-holder each time a change of tools is made. A later form of tool-holder commonly called a "single-screw tool clamp" enables the change of tools to be made by loosening and tightening each time one screw. In another plan known as "the pneumatic tool clamp" in which compressed air is used the operator is required to manipulate certain air valves besides handling and placing in position the various tools required. These and the other forms of tool-holders heretofore known, as far as we are advised, require the actual change of tools by the operator each time a change of tools is made, and as cutting tools used for the purpose specified are relatively heavy the mere handling of the same will become fatiguing to an operator and on this account, we have devised means whereby no actual tool changes are required, except in case a tool should break, therefore, when using a device such as we will now describe, there will be less fatigue upon the operator in making the tool change while the daily production or output of the machine is largely increased.

Our improved tool-holder is shown in detail in Figs. 1, 2 and 3, and while we have shown in these figures a right-hand tool block it will be understood for the class of machinery cited, that these tool-holders are made right and left and that this may be carried out without any modification of the invention, and that the tool-holder will be used in connection with the tool block with which these machines are usually supplied, and upon which block the tool holder is detachably and adjustably fitted, and that the tool holder may be fastened or clamped as a rigid part with the usual top slide of the tool block.

A tool block and its sliding top are both well known in the art, and because of this they are not shown in detail in our drawing; it will be understood, however, that the tool block and the tool slide which carries the tool holder that constitutes the essential feature of this invention, have a longitudinal and a transverse motion with respect to the axial center line of the lathe, and that by suitable and well known means, either or both of these movements may be accomplished under either a power-feed or a hand-feed.

The tool-holder, 10, is composed preferably of a single piece of metal having a thickened projection, or box holder, 11, on its upper side, which is recessed to receive lengthwise the roughing tool, 12, the nose, 13, of which is rounded and projects a suitable distance beyond the front end of the tool-holder.

The tool-holder will be supplied with one or more screws, 14, which pierce the thickened top portion, 11, thereof and are adapted to engage and appropriately clamp the tool holder in its socket, or the recess formed for its reception, the screw or screws provided for lengthwise adjustment of the nose-end of the roughing tool relatively to the tire or part of the wheel to be machined. The tool-holder is also formed with a flat seat, 15, to which is clamped by screws or otherwise, a forming plate, 16, which as shown in Figs. 1 and 2, constitutes a full-width tool the contour of which approximates that to be given the tread and flange portions of the wheel to be turned; the cutting edge of the forming blade is set back a suitable distance from the cutting end of the roughing tool, when the latter is in operation, and the two tools are in close relation and carried by the common tool-holder.

Having in view the longitudinal and transverse motions with which the tool-block and tool-holder of machines of the character described are usually provided, and assuming that a wheel mounted upon an axle or other support has been placed in the lathe, and the usual tailstock of the machine clamped down and the driving dogs on the usual face-plate thereof are brought into engagement with the wheel to be turned and the lathe started in motion, it will be understood that when the roughing tool is brought into position to begin the cutting operation, or brought to a point corresponding to the one marked X in Fig. 4, that the forming tool is at the right of the edge of the wheel or between the edge of the wheel and the right-hand face-plate, the driving dogs protruding a sufficient distance to allow for this. The roughing cut will now be started from the point, X, Fig. 4, in the direction of the arrow and the cut will be stopped substantially at the point, Y. The tool-holder is now drawn outward a proper distance and the top of the flange of the wheel indicated at 17 in Fig. 4 is cut away, the direction of the feed being the same as given in cutting the tread portion of the wheel. It will be evident from the construction of the improved tool-holder, that the forming blade or finishing tool, 16, is now substantially in position for operation and requires only to be run in by the transverse motion of the tool-holder to finish the tire.

If there is a pair of wheels mounted upon an axle, or otherwise supported adjacent the face-plates of the usual headstock and tailstock of the machine, the other wheel or the wheel on the left-hand side would be subject to operations similar to those before mentioned. After the cutting operation is completed, the wheels are removed from the machine, usually with the aid of a crane and additional helper service, and during this time the operator has only to move the tool slides longitudinally of the machine to bring the nose of the roughing tool, 12, to its proper position for an ensuing tire or tires, which when put into the lathe is subjected to the same operations as previously described.

It is quite evident, unless one or both of the tools break in service, that there are absolutely no tool changes to be made by the operator and under such condition the value of the machine as a whole is greatly enhanced in that time is manifestly saved on each operation and the operator accomplishes the result without fatigue.

The life of the roughing tools varies according to tire conditions and as soon as a roughing tool begins to show signs of failure a skilful operator can usually finish the roughing operation, put the forming tool, 16, into operation, and while the forming tool is cutting, he may take out the roughing tool and insert a new one without loss of time as the operation of finishing is constantly going on while this roughing tool change is being made. Consequently it will be apparent that the improved tool-holder herein described and shown is an important improvement, both as a time saver, work producer, and labor saver.

While we have described the operation of cutting from right to left or from the outer edge of the tire toward the flange of the wheel, it will be apparent that without departing from the essence of our invention, we can reverse the respective locations of the roughing and forming tools and begin the roughing cut on the flanged side of the wheel and feed the roughing tool opposite in direction to that described and accomplish the same result. We, however, prefer to operate as previously described, believing it to be a more practical manner of operating a tool of this character.

As the roughing tool frequently breaks, as before stated, the value of having this tool as a separate and distinct piece from the finishing tool will be apparent, since if the two tools were made integral, and the roughing tool should break because of the more severe work to which it is subjected, the breakage would destroy the tool as a whole, and as these tools are relatively expensive, both as regards the labor involved in manufacture and the large amount of steel required for a roughing tool and finishing tool combined into one piece, the value of the present improvement where the roughing tool is separate from the finishing tool, will be readily apparent to those skilled in this art.

Our roughing tool and the finishing tool are separate and distinct from each other and each tool is adapted to be rigidly and independently fastened to a common carrier or tool slide. As previously explained, the forming tool requires infrequent changing and the roughing tool is the one likely to fail and require replacement and our improved tool provides for the ready change of the roughing tool during the cutting operation of the finishing tool if the roughing tool should fail in the performance of its work.

While we have shown in the drawings the well known form of box-holder for the roughing tool, together with the common set-screws for confining the tool in its place, we do not wish to be understood as limiting the roughing tool to this specific construction and especially as the methods by which a plain tool of this description may be clamped to a holder are many and any well known and appropriate clamping means may be used without departing from the salient features of the invention.

Having thus described our invention what we claim as new and desire to secure by Letters Patent is—

1. A tool holder having a roughing tool, a separate succeeding full-width forming tool placed alongside the roughing tool, and by means whereby said tools are independently secured to the holder.

2. A tool holder having a roughing tool, a separate succeeding full-width forming tool placed alongside the roughing tool, and means whereby said tools are independently secured to the holder to permit one tool to be lengthwise adjusted relatively to the other tool, said holder forming a common support for said tools.

3. A tool-holder having a roughing tool, a separate succeeding full-width forming tool, and means whereby said tools are independently secured to the holder, said holder forming a common support for said tools, and said roughing tool being lengthwise adjustable on said support and having a rounded nose.

4. A tool-holder consisting of a support or base member having an apertured projection on its upper surface, a roughing tool slidably mounted in said aperture, means for fixedly securing the roughing tool to the base member, a forming blade separate from the roughing tool and in close relation thereto, and means for fixedly securing the forming blade to the base member.

5. A tool-holder for metal turning lathes, said holder consisting of a base member, a roughing tool and means for adjustably securing it to the base member, a blade alongside the roughing tool and separate therefrom and having an edge fashioned to the true contour of the part to be turned, and means independent of the roughing-tool securing-means for securing the blade to the holder.

In testimony whereof we affix our signatures in presence of two witnesses.

SALMON WILDER PUTNAM, 3D.
FRANK JOSEPH BAUMIS.

Witnesses as to the signature of Salmon Wilder Putnam, 3d:
ALFRED C. ANDERSON,
MINOT R. STEUART.

Witnesses as to the signature of Frank Joseph Baumis:
Y. BABCOCK,
R. R. CUTHBERTSON.